June 8, 1948. H. H. HARMON 2,443,163
FLASHHOLDER
Filed Nov. 23, 1946
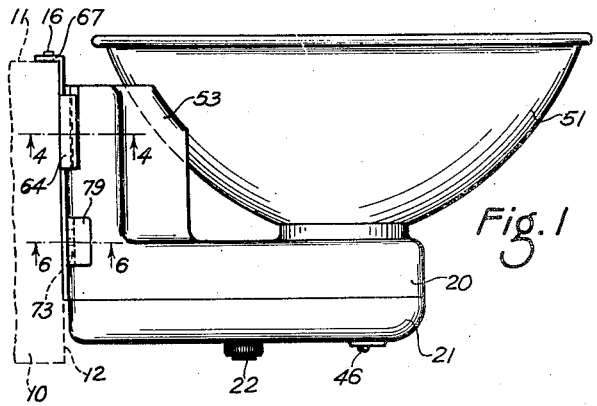
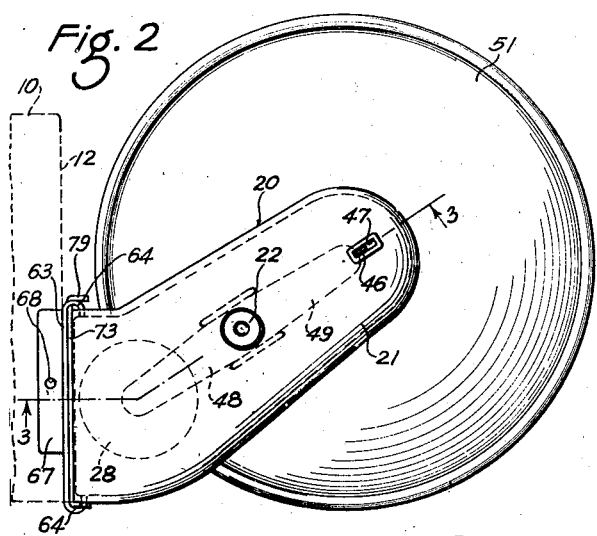
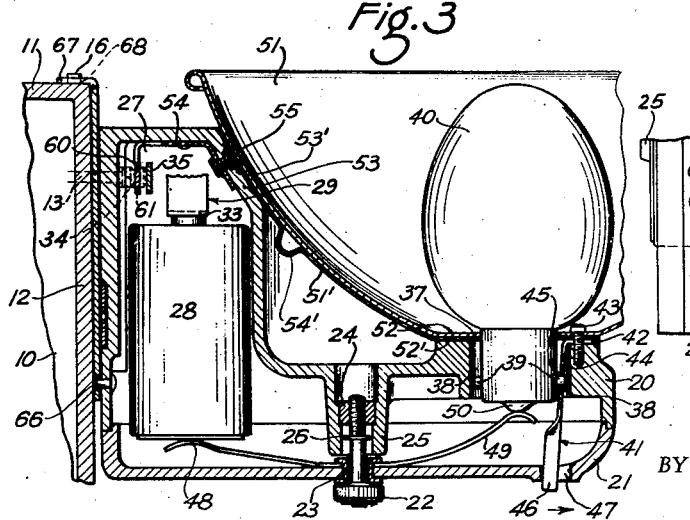
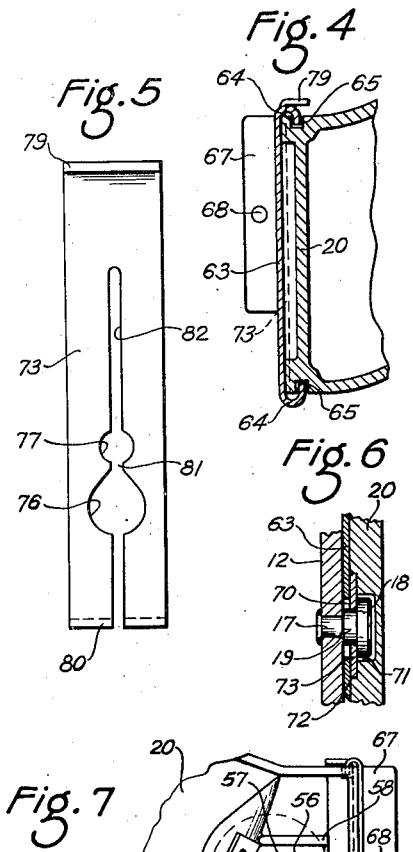
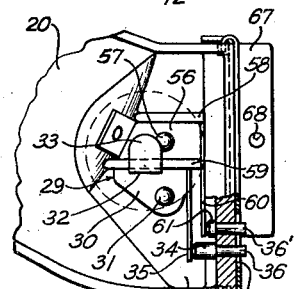
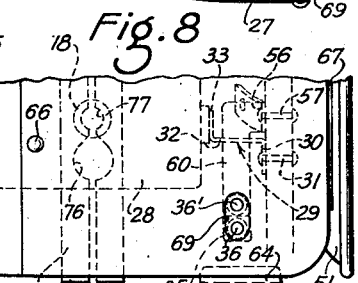
Herbert H. Harmon
INVENTOR
BY
ATTORNEYS Patented June 8, 1948

2,443,163

UNITED STATES PATENT OFFICE 2,443,163

FLASH HOLDER

Herbert H. Harmon, Rochester, N. Y., assignor to Eastman Kodak Company, Rochester, N. Y., a corporation of New Jersey Application November 23, 1946, Serial No. 711,869

8 Claims. (Cl. 67—31)

The present invention relates to flashlight photography, and particularly to a flashholder to be detachably mounted on a flashlight camera having a built-in flash synchronizer and arranged so that the battery and flash lamp of the holder are automatically connected in circuit with the synchronizer switch in the camera when the holder is attached thereto.

The primary object of the present invention is to provide a flashholder which can be readily connected to and disconnected from a flash camera and arranged so that the open battery circuit therein will automatically connect with the synchronizer switch controlled circuit of the camera when the flashholder is attached to the camera body.

Other objects of the invention include the provision of a flashholder which is compact in convision of a flashholder which is compact in construction and can be produced at a reasonable cost; which has a means for detachably mounting the same on the camera body which accurately locates the pairs of contacts on the holder with those on the camera body and necessitates them being brought together in the proper engaging relationship; which has a manually actuated latching means which prevents accidental removal of the flashholder from the camera body; which is so arranged that the battery circuit therein includes no wires which must be soldered to contacts and might become disconnected; and which includes a novel releasable locking means for holding the flash lamp in its socket.

The novel features that I consider characteristic of my invention are set forth with particularity in the appended claims. The invention itself, however, both as to its organization and its method of operation, together with additional objects and advantages thereof will best be understood from the following description of specific embodiments when read in connection with the accompanying drawings in which;

Fig. 1 is a top plan view showing a flashholder constructed in accordance with the preferred embodiment of the present invention attached to the side wall of a camera body in operative relation for flash photography;

Fig. 2 is a rear elevational view of the flashholder and camera combination shown in Fig. 2;

Fig. 3 is a sectional view taken substantially on line 3—3 of Fig. 2;

Fig. 4 is an enlarged sectional view taken substantially on line 4—4 of Fig. 1, and showing how the mounting plate is attached to the casing of the flashholder;

Fig. 5 is an elevational detail of the latch member forming a part of the flashholder and serving to latch the same on the camera body;

Fig. 6 is an enlarged sectional detail taken substantially on line 6—6 of Fig. 1, and showing how the flashholder is latched to the camera body;

Fig. 7 is a rear view looking into the battery compartment of the casing with the cover and battery removed, and partly in section to show the form and relation of the ground and battery connectors and contact pins of the holder which are adapted to engage a corresponding pair of contacts on the camera body to complete the flash synchronizing circuit; and Fig. 8 is a partial side view of the flashholder with the cover removed, looking directly at the right side of the holder as shown in Fig. 1, and indicating the position the attaching stud on the camera body assumes when the flashholder is latched on the camera body.

Like reference characters refer to corresponding parts throughout the drawings.

The present flashholder is of the well-known type which houses the battery and flashlamp and includes two spaced contacts which are adapted to engage a pair of corresponding contacts on the camera body when the holder is attached to the camera to connect the battery circuit to the synchronizer switch circuit in the camera so that the switch will control the flashing of the lamp. Cameras of this type usually have the synchronizer switch built into the camera shutter mechanism so that the lamp circuit is closed in proper synchronization with the opening movement of the shutter. Inasmuch as the synchronizer mechanism built into the camera may be of any one of several well-known varieties and forms no part of the invention, and inasmuch as the form of the camera body itself is of no consequence, I have chosen to indicate the camera body only by two walls at substantially right angles to one another for the purpose of disclosing my invention.

Referring now to the drawings, and particularly Figs. 1 and 3, the camera body 10 with which my flashholder is adapted for use may be of a generally rectangular shape and include a front wall 11 and a side wall 12 at substantially right angles to one another. Extending from the side wall of the camera there are two spaced electrical contacts, one of which is indicated at 13 in Fig. 3, and which may be connected to opposite terminals of the synchronizer switch in the camera in any suitable way. Extending from the front wall of the camera body is a locating pin 16 which cooperates with a mounting plate on the flashholder, in a manner to be hereinafter described, to properly position the holder on the camera to facilitate proper engagement of the contacts on the camera body with a pair of contacts on the flashholder. Extending from the side wall of the camera body is an attaching stud 17, of the form best shown in Fig. 6, and having an enlarged head 18 and a shank 19 smaller in diameter than the head.

Coming now to the flashholder per se, this part comprises a substantially L-shaped open casing 20 which is adapted to be closed by a cover 21. Both the casing and cover are preferably molded from a plastic material which has the property of being an insulator for electricity. The cover 21 is detachably connected to the casing by means of a bolt 22 which is rotatably mounted in a bushing 23 and screws into a nut 24 pressed into a boss 25 molded into the front wall of the casing. A captive pin 26 extending thru the shank of the bolt prevents the bolt from becoming accidentally disengaged from the cover.

As shown in Fig. 3, the short arm of the L-shaped casing 20 provides a compartment 27 in which a small dry cell battery 28 is adapted to be located. The positive terminal of the battery engages a battery connector 29 of the form best shown in Figs. 7 and 8. This connector comprises a base portion 30 which is riveted at 31 to the forward wall of the compartment 27 and from which an arm 32 extends having a turned-up battery terminal engaging portion 33 on the end thereof. Extending downwardly from the base portion 30 is a resilient arm 34 which presses against the rounded end of contact pin 35 to normally force said pin outwardly of the side wall of the casing. This contact pin is freely slidable in a bore in the side wall of the casing and the shoulder on the head of the pin limits the outward movement thereof. It is the outer end 36 of this pin which is adapted to engage one of the two spaced contacts on the camera body when the flashholder is mounted thereon.

The front wall of the casing 20 is provided with bore 37 in the wall of which are formed two diametrically spaced grooves 38 for the reception of the two bayonet pins 39 on the base of the flash lamp 40. The lamp is releasably locked in the bore 37 by a release member 41 which has a turned down end 42 fastened to the front of the casing by a screw 43. The release member 41 is made of resilient metal and includes a straight portion 44 which normally extends at an angle lengthwise of one of the grooves 38 to permit the pin on the lamp base to enter said groove. As the lamp is pushed into the bore the pin on the lamp base cams the release member toward the bottom of the groove 38 until it snaps into a hole 45 in the arm, whereupon the release member snaps toward the lamp base to lock the lamp in the bore. The extreme end 46 of the release member is twisted 90° relative to the portion thereof lying in the groove 38 and extends through an elongated narrow opening 47 in the cover. Thus, by pressing on the end 46 of the release member in the direction of the arrow shown in Fig. 3, the release member is moved away from the base of the lamp to free the pin thereon so that the lamp will be ejected from the bore by a spring action as will be described hereinafter.

In encircling relation with the bushing 23 on the cover is a bowed spring one end 48 of which engages the negative terminal of the battery and serves to press the positive terminal thereof into contact with portion 33 of the battery connector, while the other end 49 of which engages the contact 50 in the base of the lamp. This spring, therefore, provides three functions, (1) it constitutes the electrical connector between the battery and the lamp, (2) it resiliently holds the battery in place, and (3) it serves as the ejecting force to eject the lamp from the socket when the same is released by the release member. It will be appreciated that the complete lamp socket is made up of the bore 37 in the front wall of the casing, the end 49 of the bowed spring, and the release member 41, the last two parts entering into this part since they constitute the electrical contacts of the socket.

Fixed to the front of the casing in surrounding relation to the lamp is a metal reflector 51. If this reflector is made of a metal which is sufficiently conductive it may be used as a conductor forming a part of the ground circuit of the battery. To this end, the base 52 of the reflector is mounted on the front of the casing and is held in engagement with the turned-down end 42 of the release member 41 by the screw 43. A portion of the wall of the reflector adjacent to the open end thereof lies in contact with a curved surface 53 formed on the casing and is fixed to said surface and electrically connected to a ground connector 54, in the forward end of the battery compartment, by a screw 55.

As clearly shown in Figs. 3, 7 and 8, the ground connector 54 includes a base portion 56 which is riveted at 57 to the forward end of compartment. The ground connector 54 is located between two plastic ribs 58 and 59 formed upon the forward wall of the battery compartment, and is insulated from battery connector 29 by the latter one of said ribs. Extending from the base portion of the ground connector is a resilient arm 60, the end of which engages the rounded end of a second contact pin 61 to normally press the same outwardly of the side wall of the casing. The end 36' of this pin is the one which is adapted to engage the other contact pin on the outside of the camera body. The head of the contact pin 35 is made longer than that of contact pin 61 in order to prevent the resilient arm 34 of the battery connector 29 from engaging the resilient arm 60 of ground connector 54 and thus short circuiting the battery. The described mounting of the contact pins 35 and 61 is preferable to having them mounted directly on the ends of the resilient arms of the connectors, because it overcomes all difficulty of a binding action which follows such other mounting due to the slight arcuate movement the pins tend to take if fixed to the ends of the arms. With the present arrangement, the contact pins move smoothly and effortlessly, since only a straight thrust is applied thereto by virtue of the sliding movement between the resilient arms of the connectors and the rounded ends of the pins.

It has been found that if the rear surface of the reflector 51 is anodized, some difficulty is encountered in getting it to act as a sufficiently good conductor of the low voltage current available. It is not known whether this is due to the inability of obtaining a good contact between this type of surface and the other conductors or whether it is due to the conductive properties of the metal being changed due to this treatment. If this condition exists, it can be overcome by the use of a jumper contact 51' as shown in Fig.

3. This jumper contact comprises a long strip of metal curved to fit against the back of the reflector 51 and having a looped end 52' adapted to surround the base of the lamp and be fixed to the casing in contact with the turned down end 42 of release member 41 by the screw 43. The other end of the jumper contact is provided with a countersunk aperture 53' which is adapted to surround and engage the screw 55 holding the ground connector 54 and reflector 51 to the casing. This jumper may be provided with a bowed portion 54' which permits of a slight change in length and in shape of the member necessitated in the assembly operation.

In order to fully understand the significance of the means I have provided for attaching the flashholder to the camera body, the problem involved in this operation should be particularly pointed out. It will be noticed by an inspection of Fig. 7 that the contact pins 35 and 61 normally extend from the side of the flashholder. Since the same is true of the corresponding contact pins on the camera body, in the preferred instance, it stands to reason that these pairs of contacts can not be brought into end to end engagement if the flashholder is attached to the camera body by a sliding action between the two. Even if the contacts on the camera body were flush with the camera wall, or recessed slightly relative thereto, a sliding action of the holder in mounting it on the camera would be objectional. This would not be because of the inability of bringing the pairs of contacts into engagement but because such sliding action would cause the contacts on the flashholder to scratch the camera wall and/or a side-wise strain would be placed on said pins which, in time, might cause them to bind.

Coming now to the attaching means for the flashholder, on the flat side wall of the casing 20 there is fixed a mounting plate 63. As shown in Figs. 4 and 8, this plate is mounted on the casing by having turned-over positions 64 on opposite sides of the forward end thereof slid into engagement with grooves 65 molded into the top and bottom walls of the casing adjacent the side wall thereof and having the rear end thereof riveted to the casing wall after such assembly, as indicated at 66 in Figs. 3 and 8. The forward end of the mounting plate 63 is turned in to provide a flange 67 which is adapted to engage the front wall of the camera when the flashholder is mounted thereon. This flange 67 is provided with a locating aperture 68 which is adapted to engage the locating pin 16 on the front wall of the camera to locate the holder on the camera body so that the pairs of contacts on the holder and camera body will come into engagement when the holder is swung onto the camera body. In order to place the fashholder on the camera body it is necessary to first hold the flashholder at an angle to the camera body and engage the locating pin 16 in the locating aperture 68, then the holder can be swung inwardly toward the side wall of the camera until the face of the mounting plate is in engagement with the camera side wall. The attaching stud 17 extending from the camera side wall prevents the flashholder from being attached to the camera by a straight sliding movement from the front to the back of the camera. The mounting plate 63 includes an aperture 69 see Fig. 7, through which the contact pins 35 and 61 are adapted to extend.

As clearly shown in Fig. 6, the mounting plate 63 is provided with an aperture 70 through which the head of the attaching stud 17 on the camera side wall is adapted to extend when the flashholder is mounted on the camera body. The side wall of the camera is also provided with a recess 71 which is large enough to receive the head of the attaching stud. Slidably mounted in a groove 72 in the side wall of said casing, and confined to said groove by the mounting plate 63, is a latch member 73 of the form best shown in Fig. 5. This latch member includes a lower aperture 76 which is large enough to pass the head of the attaching stud 17 and an upper aperture 77 which is smaller than aperture 76 and of such a size as to pass the shank 19 of the attaching stud 17, see Fig. 8. The upper end of the latch member is turned over to provide a finger piece 79 by means of which the latch member can be raised to a release position, wherein the large aperture 76 therein is aligned with the aperture 70 in the mounting plate to permit the head of the attaching stud 17 to pass into and out of the recess 71 in the side wall of the camera and lowered to latching position, wherein the small aperture 77 therein is moved into alignment with said aperture 70 in the mounting plate to engage the shank 19 of the stud 17 and prevent the flashholder from being removed from the camera body. The finger piece 79 and a rolled-over end 80 on the latch member prevent the latch member from being slid out of assembled relationship between the mounting plate and the side wall of the casing.

In order to prevent the latch member from being accidentally moved from a latching position, whereupon the flashholder will accidentally fall off of the camera body, I provide a simple and effective means for frictionally holding the latch member in a latching position. To this end, as clearly shown in Fig. 5, the large and small apertures 76 and 77 in the latch member 73 are connected by a restricted passage 81 which is slightly narrower than the diameter of the shank 19 of the attaching stud 17. Then the latch member is provided with a slot 82 extending from its lower end, through the center line of apertures 76 and 77 to a point above said apertures. This slot permits the two lower ends of the latch member to spring from one another laterally of the length of the member and permits the restricted passage 81 to open up sufficiently to allow the shank 19 of the stud to pass from one aperture to the other. It will then be obvious that in order to move the latch member 73 from a latching position to a release position, sufficient pull must be exerted on the latch member to cause the ends thereof to spread and open up the restricted passage 81 enough to allow passage of the shank 19 of the stud 17.

From the above description it will be appreciated that I have provided a flashholder which is particularly simple from the standpoint of assembly, as well as rugged, inasmuch as no individual wires are used as conductors nor are any soldered joints required. The manner and mechanism provided for attaching the flashholder to the camera body, in addition to causing proper alignment and engagement of the pairs of contacts on the two parts, prevents a relative sliding movement between the two parts which might cause the side wall of the camera to be marred or cause the contacts to be broken. It also provides a frictional latching arrangement which eliminates any chance of the flashholder becoming accidentally removed from the camera body.

Although I have shown and described certain specific embodiments of my invention, I am fully aware that many modifications thereof are possible. My invention, therefore, is not to be limited to the precise details of construction shown and described, but is intended to cover all modifications coming within the scope of the appended claims.

Having thus described my invention, what I claim is new and desire to secure by Letters Patent in the United States is:

1. A flashholder for use in combination with a flash camera having a locating pin and an attaching stud extending from the body thereof, and a pair of electrical contacts located on the outside of the body, and comprising a casing, a battery in said casing, a flash lamp socket in said casing, a pair of contact pins extending from one wall of said casing, means for connecting one side of said battery to one of said contact pins and for connecting the other side of said battery through said socket to the other of said contact pins, a mounting plate fixed to one wall of said casing and provided with one aperture adapted to engage said locating pin on the camera body and a second aperture adapted to receive the head of said attaching stud on the camera body whereby the contact pins on the casing are moved into engagement with the contacts on said camera body, and a releasable latching member mounted on the face of said mounting plate to move to and from a latching position wherein it engages the head of said attaching stud to prevent its removal from the aperture in said mounting plate and thereby latch the casing on said camera body.

2. A flashholder according to claim 1, and in which the latch member is arranged to frictionally engage said attaching stud to prevent accidental movement of the same to a release position.

3. A flashholder according to claim 1, and in which the latch member comprises a member provided with a hole large enough to pass the head of said attaching screw and a restricted aperture smaller than said hole and adapted to engage the shank of said attaching screw, said hole and restricted aperture being joined by a restricted passage slightly narrower than the diameter of said restricted aperture, said latch member slidably mounted on said mounting plate to move between a release position wherein said hole therein is aligned with said second aperture in the mounting plate and a latching position wherein the restricted aperture is aligned with said aperture in the mounting plate, said latch member being split along the line of centers of said hole and aperture to permit spreading of said restricted passage as the member is moved between its two positions when the attaching stud extends through said member.

4. A flashholder for use in combination with a camera body having a locating pin on its front wall, an attaching stud extending from its side wall and a pair of electrical contacts located on one of said walls and comprising a casing, a battery in said casing, a flash lamp socket in said casing, a pair of contact pins extending from one wall of said casing, means for connecting one side of said battery to one of said contact pins and for connecting the other side of said battery through said socket to the other of said contact pins, a mounting plate attached to one wall of said casing and including a first arm adapted to engage the side wall of the camera body and a second arm adapted to engage the front wall of said camera body, said second arm including an aperture adapted to slip over said locating pin to correctly position the holder on said camera body so that the contact pins on said casing will engage the contacts on said camera, said first arm provided with an aperture to receive the head of said attaching stud when the casing is mounted on said camera, and a releasable latching member mounted on said mounting plate adapted to move into latching engagement with the head of said attaching screw to latch the casing on said camera body.

5. A flashholder comprising in combination a casing of plastic insulating material, a battery in said casing, a pair of headed contact pins slidably mounted in openings in the wall of said casing and constituting the terminals of the battery circuit in said casing and adapted to engage a corresponding pair of electrical contacts extending from the wall of flash camera provided with a flash synchronizer switch when the casing is mounted on said camera, a connector between the positive terminal of said battery and one of said contact pins and including a resilient arm engaging the head of one of said pins to normally force the pin outwardly of said casing, a removable cover for said casing, the ground circuit of said battery including a double-ended metal spring carried by said cover and having one end adapted to engage the ground terminal of the battery and the other end adapted to engage the base contact of the flash lamp and serve as the ejector thereof when the lamp is released from locking engagement with said socket, a ground connector fixed to the casing remote from said socket and including a resilient arm for engaging the head of the other contact pin to normally force said pin outwardly of said casing, and a jumper connection between said socket and said ground connector and lying outside of said casing.

6. A flashholder according to claim 5 and in which said jumper connection constitutes a metal reflector surrounding said lamp and having the base thereof electrically connected to the socket and a point on the reflector surface remote from said base electrically connected to said ground connector.

7. A flashholder according to claim 5 adapted to accommodate flash lamps having bayonet-type bases and in which the socket comprises a bore in said casing wall having diametrically spaced grooves to receive and locate the position of the pins on the lamp base, a metal lamp release member fixed at one end to said casing and grounded to said jumper connection, and including a resilient arm normally lying at an angle in and along one of said grooves and provided with an aperture adapted to engage the pin on the base of the lamp when the latter is pushed into said socket to lock the lamp in the socket against the action of said ejector spring, said release member constituting the connector between the lamp and said jumper connection, and means for manually moving said release member to a lamp releasing position.

8. A flashholder according to claim 5 adapted to accommodate flash lamps having bayonet-type bases and in which the socket comprises a bore in said casing wall having diametrically spaced grooves to receive and locate the position of the pins on the lamp base, a metal lamp release member fixed at one end to said casing and grounded to said jumper connection, and including a resilient arm normally lying at an angle in and along one of said grooves and provided with an aperture adapted to engage the pin on the base of the lamp when the latter is pushed into said socket to lock the lamp in the socket against the action of said ejector spring, said release member constituting the connector between the lamp and said jumper connection, the end of said release member extending through an opening in the casing and providing a finger piece by means of which said member may be sprung from its normal position in said recess to disengage the aperture therein from locking engagement with the pin on the base of the lamp.

HERBERT H. HARMON.

REFERENCES CITED

The following references are of record in the file of this patent:

UNITED STATES PATENTS

| Number | Name | Date |
| --- | --- | --- |
| 1,997,315 | Schwartz | Apr. 9, 1935 |
| 2,286,808 | Hutchison | June 16, 1942 |